United States Patent
Kim et al.

(10) Patent No.: US 10,749,560 B2
(45) Date of Patent: Aug. 18, 2020

(54) AUDIO APPARATUS AND CONTROL METHOD THEREFOR

(71) Applicant: SAMSUNG ELECTRONICS CO., LTD., Suwon-si (KR)

(72) Inventors: Jae-won Kim, Suwon-si (KR); Jae-heung Park, Suwon-si (KR); Sun-ki Kim, Suwon-si (KR); Woon-hee Park, Anyang-si (KR); Dong-jae Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/090,492

(22) PCT Filed: Mar. 23, 2017

(86) PCT No.: PCT/KR2017/003100
§ 371 (c)(1),
(2) Date: Oct. 1, 2018

(87) PCT Pub. No.: WO2017/183816
PCT Pub. Date: Oct. 26, 2017

(65) Prior Publication Data
US 2019/0115944 A1    Apr. 18, 2019

(30) Foreign Application Priority Data

Apr. 22, 2016 (KR) .......... 10-2016-0049504
Sep. 30, 2016 (KR) .......... 10-2016-0125992

(51) Int. Cl.
*H04R 7/02* (2006.01)
*H04B 1/3827* (2015.01)
(Continued)

(52) U.S. Cl.
CPC .......... *H04B 1/385* (2013.01); *G01B 17/02* (2013.01); *G01H 1/04* (2013.01); *H04R 1/026* (2013.01);
(Continued)

(58) Field of Classification Search
CPC .. H04R 7/045; H04R 11/02; H04R 2201/023; H04R 2400/07; H04R 2440/05
See application file for complete search history.

(56) References Cited

U.S. PATENT DOCUMENTS 8,170,243 B2 * 5/2012 Kondo ............. H04R 7/045
                                                        381/152
9,569,951 B2 * 2/2017 Cholhan ............ H04W 4/90
(Continued)

FOREIGN PATENT DOCUMENTS

CN        102638747 A      8/2012
CN        103797776 A      5/2014
(Continued)

OTHER PUBLICATIONS

Hoiem, Derek, "Solar: Sound Object Localization and Retrieval in Complex Audio Environments", Proceedings, (ICASSP '05), IEEE International Conference on Acoustics, Speech, and Signal Processing, 2005, Philadelphia, PA., pp. v/429-v/432, vol. 5. (5 pages total).
(Continued)

*Primary Examiner* — Fan S Tsang
*Assistant Examiner* — Ryan Robinson
(74) *Attorney, Agent, or Firm* — Sughrue Mion, PLLC

(57) ABSTRACT

An audio apparatus and a control method therefor are provided. The present audio apparatus comprises: a vibration part for providing audio using vibration; a sensing part for sensing one or more of the material and the thickness of an object to which the audio apparatus is attached; a pressure regulation part for regulating the pressure that is applied to
(Continued)

the object by the vibration part; and a processor for controlling the pressure regulation part in order to regulate the pressure applied to the object by the vibration part based on one or more of the material and the thickness of the object that is sensed by the sensing part.

9 Claims, 24 Drawing Sheets

(51) Int. Cl.
  *G01H 1/04*    (2006.01)
  *H04R 1/02*    (2006.01)
  *G01B 17/02*   (2006.01)
  *B06B 1/04*    (2006.01)
  *H04R 1/04*    (2006.01)

(52) U.S. Cl.
  CPC ........ *B06B 1/04* (2013.01); *H04B 2001/3866* (2013.01); *H04R 1/04* (2013.01); *H04R 2201/023* (2013.01); *H04R 2499/13* (2013.01)

(56) References Cited

U.S. PATENT DOCUMENTS

| | | | |
|---|---|---|---|
| 10,219,060 B2 * | 2/2019 | Koper | A42B 3/306 |
| 2006/0227982 A1 | 10/2006 | Miranda | |
| 2008/0298608 A1 * | 12/2008 | Wilcox | H03F 3/20 |
| | | | 381/120 |
| 2009/0161893 A1 * | 6/2009 | Hironaka | H04M 1/6066 |
| | | | 381/151 |
| 2014/0185837 A1 * | 7/2014 | Kunimoto | H04R 1/1075 |
| | | | 381/151 |

FOREIGN PATENT DOCUMENTS

| | | |
|---|---|---|
| CN | 103827959 A | 5/2014 |
| CN | 104095334 A | 10/2014 |
| CN | 204483186 U | 7/2015 |
| FR | 2968881 A1 * | 6/2012 ............... H04R 9/06 |
| JP | 2006-42021 A | 2/2006 |
| JP | 2006-207108 A | 8/2006 |
| JP | 2006-332715 A | 12/2006 |
| JP | 2008-236637 A | 10/2008 |
| KR | 20-0387717 Y1 | 6/2005 |
| KR | 20-0453627 Y1 | 5/2011 |
| KR | 10-1301602 B1 | 8/2013 |
| KR | 10-2015-0058866 A | 5/2015 |
| KR | 10-1550706 B1 | 9/2015 |
| KR | 10-2015-0116358 A | 10/2015 |
| KR | 10-2016-0015348 A | 2/2016 |
| WO | WO-0191509 A1 * | 11/2001 ............... A42B 3/30 |
| WO | WO-2006126282 A1 * | 11/2006 ............... A42B 3/30 |
| WO | 2013/022981 A2 | 2/2013 |
| WO | 2013/045976 A1 | 4/2013 |

OTHER PUBLICATIONS

Office Action dated May 2, 2017 by the Korean Intellectual Property Office in counterpart Korean Patent Application No. 10-2016-0125992.

Office Action dated Sep. 8, 2017 by the Korean Intellectual Property Office in counterpart Korean Patent Application No. 10-2016-0125992.

Decision to Grant Patent dated Nov. 21, 2017 by the Korean Intellectual Property Office in counterpart Korean Patent Application No. 10-2016-0125992.

Search Report dated May 23, 2017 by the Korean Intellectual Property Office in counterpart Korean Patent Application No. 10-2016-0125992. (PCT/ISA/210).

Written Opinion dated May 23, 2017 by the Korean Intellectual Property Office in counterpart Korean Patent Application No. 10-2016-0125992. (PCT/ISA/237).

Communication dated Aug. 20, 2019 issued by the State Intellectual Property Office of P.R. China in counterpart Chinese Application No. 201710256391.7.

Communication dated May 7, 2020, issued by the State Intellectual Property Office of P.R. China in counterpart Chinese Application No. 201710256391.7.

* cited by examiner

AUDIO APPARATUS AND CONTROL METHOD THEREFOR

TECHNICAL FIELD

Apparatuses and methods consistent with the disclosure relate to an audio apparatus and a control method therefor, and more particularly, to an audio apparatus which provides audio through a vibration by being attached to an object that a user wears, and a control method therefor.

BACKGROUND ART

Helmets have been recently worn in various types of fields. For example, a worker who works in various environments, such as a building site, a logging site, a factory, a plane operation, facilities, vehicle driving, and the like, is to indispensably wear a helmet. In addition, as hobbies become diverse like skis, inline skates, a board, a bicycle, a motorcycle, an amusement park, and the like, cases where ordinary people are to wear helmets occur frequently.

Helmets are demanded in various environments as described above. However, if a helmet is used, the helmet may cover ears, and if ambient noise is very serious, generally output audio may not be frequently appropriately heard. Also, if the helmet is used, there are many cases where both hands may not be quite freely used.

For solving this problem, an audio apparatus which is attached to a helmet and provides audio through a vibration has been provide. However, a sound quality or a sound volume of audio which is proved through a vibration becomes different according to various main factors such as a type, a thickness, and the like of a helmet. Therefore, it is difficult to provide a user with an optimum sound quality.

DETAILED DESCRIPTION OF THE INVENTION

Technical Problem

The disclosure provides an audio apparatus which provides optimum audio according to a characteristic of an object to which the audio apparatus is attached, by sensing the characteristic of the object, and a control method therefor.

Technical Solution

According to an aspect of the disclosure n audio apparatus includes a vibration part which provides audio using a vibration, a sensing part which senses at least one of a material and a thickness of an object to which the audio apparatus is attached, a pressure regulation part which regulates pressure which is applied to the object by the vibration part, and a processor which controls the pressure regulation part to regulate the pressure applied to the object by the vibration part based on at least one of the material and the thickness of the object which is sensed by the sensing part.

According to another aspect of the disclosure, a control method for an audio apparatus including a vibration part providing audio by using a vibration, includes sensing at least one of a material and a thickness of an object to which the audio apparatus is attached, and regulating pressure, which is applied to the object by the vibration part, based on at least one of the sensed thickness and material of the object.

Effects of the Invention

According to an exemplary embodiment of the disclosure as described above, although a user wears a helmet, the user may be provided with optimum audio according to a characteristic of the helmet. Also, the user may be provided with various user experiences through an audio apparatus which is attached to the helmet.

BEST MODE OF THE INVENTION

Figure 1A:
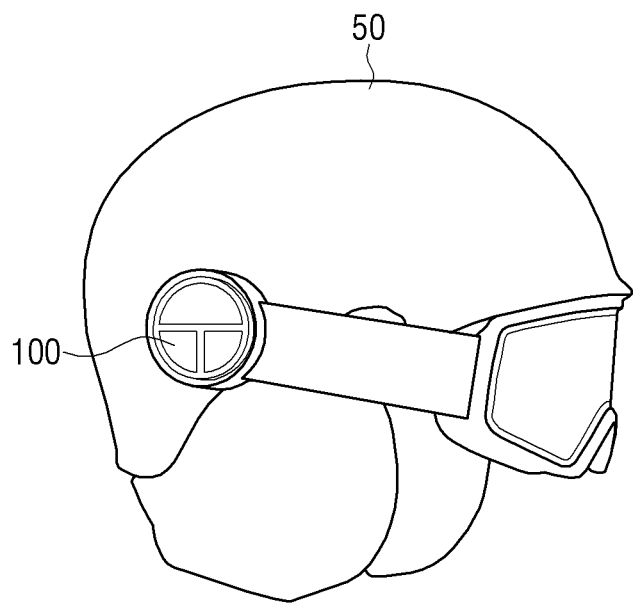
FIG. 1A is a view illustrating an audio apparatus which is attached to a helmet, according to an exemplary embodiment of the disclosure.

The terms used herein will be described in brief, and the disclosure will be described in detail.

Terms used herein are selected from general terms, which are currently widely used, in consideration of functions in the disclosure but may vary with intentions of those skilled in the art or precedents, emergences of new technologies, and the like. Also, there are terms, which are arbitrarily selected by an applicant, in a particular case, and meanings thereof will be described in detail in descriptions of exemplary embodiments corresponding to this case. Therefore, terms used in the exemplary embodiments are defined based on meanings thereof and contents all over the exemplary embodiments not based on simple names thereof.

Exemplary embodiments of the disclosure may be made into various modifications and may have several types of exemplary embodiments. Therefore, particular exemplary embodiments will be illustrated in the drawings and will be described in detail in the detailed description. However, this is not intended to limit the scope of a particular exemplary embodiment and may be understood as including all modifications, equivalents, and alternatives belonging to the spirit and scope of the disclosure. If detailed descriptions of well-known technology related to descriptions of exemplary embodiments make the main point of the disclosure obscure, the detailed descriptions will be omitted.

Although the terms first, second, etc. may be used herein to describe various elements, these elements may not be limited by these terms. These terms are merely used to distinguish one element form another element.

As used herein, the singular forms are intended to include the plural forms as well, unless the context clearly indicates otherwise. The terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In the exemplary embodiments, a "module" or "part" may perform at least one function or operation and may be embodied as hardware, software, or a combination of hardware and software. Also, a plurality of "modules" or a plurality of "parts" may be embodied as at least one processor (not shown) by being integrated into at least one module except for a "module" or a "part" which is to be embodied as particular hardware.

In addition, in the exemplary embodiments of the disclosure, when a part is referred to as being "connected to" or "coupled to" another part, it may be directly electrically connected or coupled to the other part or intervening elements may be present. Also, when a part "includes or comprises" an element, it may mean as further including another element not excluding another element, unless the context clearly indicates otherwise Exemplary embodiments of the disclosure will be described in detail with reference to the attached drawings and thus may be easily implemented by those skilled in the art. However, the disclosure may be embodied in several types of different forms and are not limited to exemplary embodiments described herein. Also, parts which are not related to descriptions of the disclosure are omitted for clearly describing the disclosure, and similar parts are denoted by similar reference numerals throughout the disclosure.

Hereinafter, the disclosure will be described with reference to the drawings. FIG. 1A is a view illustrating an audio apparatus which is attached to a helmet, according to an exemplary embodiment of the disclosure. As shown in FIG. 1A, an audio apparatus 100 may provide a user with audio through a vibration by being attached to a particular area of a helmet 50. Here, the audio apparatus 100 may be attached to an area of the helmet 50 corresponding to an ear, but this is merely an exemplary embodiment. Therefore, the audio apparatus 100 may be attached to an arbitrary area of the helmet 50.

In particular, the audio apparatus 100 may vibrate the helmet 50 to which the audio apparatus 100 is attached, and the helmet 50 which vibrates may provide the user with audio by operating as a speaker. In detail, the audio apparatus 100 may vibrate air through a medium (the helmet 50) by using a vibration of a vibration part resulting from an electromagnetic field phenomenon of a coil and a magnet and enable the user to hear the vibrated air and thus to be provided with audio.

Figure 1B:
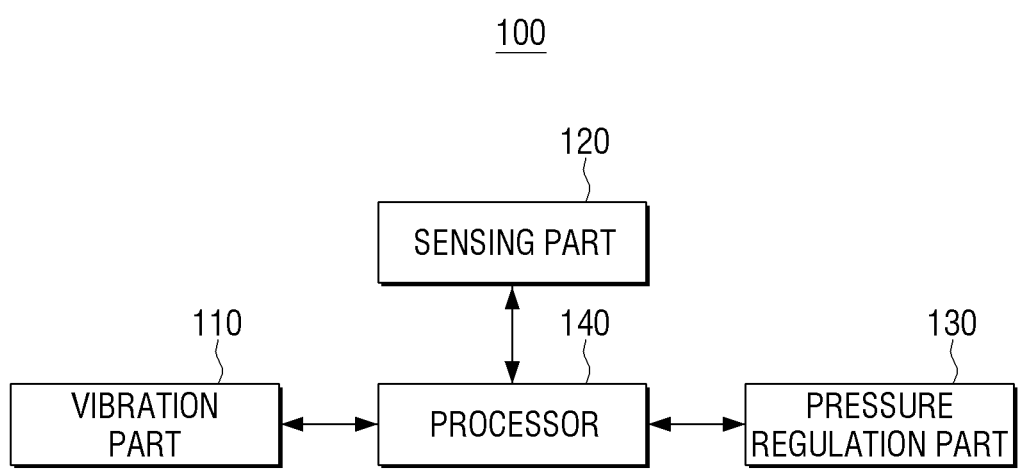
FIG. 1B is a block diagram of a simple configuration of an audio apparatus according to an exemplary embodiment of the disclosure.

FIG. 1B is a block diagram of a simple configuration of an audio apparatus according to an exemplary embodiment of the disclosure. The audio apparatus 100 includes a vibration part 110, a sensing part 120, a pressure regulation part 130, and a processor 140.

The vibration part 110 may provide audio by using a vibration. In detail, the vibration part 110 may vibrate a vibration device through an electromagnetic phenomenon of a coil and a magnet included in the vibration part 110, and the vibration of the vibration device may be provided as audio for the user through the medium (the helmet 50)

The sensing part 120 senses at least one of a material and a thickness of an object (i.e., the helmet 50) to which the audio apparatus 100 is attached. Here, the sensing part 120 may be realized as an ultrasonic sensor. In detail, the sensing part 120 may determine a type of helmet of the object 50 by measuring the thickness of the object 50 through a time for which an ultrasonic wave generated from the ultrasonic sensor contacts and is reflected from the object 50, and measuring a volume of an ultrasonic wave absorbed when penetrating the object 50 and a volume of a scattered ultrasonic wave.

The pressure regulation part 130 regulates a pressure which is applied to the object 50 by the vibration part 110. In detail, the vibration part 110 provides audio having different sound qualities according to the pressure which is applied to the object 50. Here, the pressure regulation part 130 may provide an optimum sound quality by regulating the pressure which is applied to the object 50 by the vibration part 110.

In particular, the pressure regulation part 130 includes a suspension part which supports the vibration part 110 according to pressure data corresponding to the material and the thickness of the object 50 sensed by the sensing part 120 and a motor part which regulates a distance between the suspension part and the object 50. Here, as the motor part regulates the distance between the suspension part and the object 50, the audio apparatus 100 may regulate the pressure which is applied to the object 50.

The processor 140 controls an overall operation of the audio apparatus 100. In particular, the processor 140 may control the pressure regulation part 130 to regulate the pressure, which is applied to the object 50 by the vibration part 50, based on at least one of the material and the thickness of the object 50 sensed by the sensing part 120.

In detail, the processor 140 may search a storage part for pressure data corresponding to information on the thickness and the material of the object 50 sensed through the sensing part 120 and control the monitor part based on the searched pressure data. In other words, the processor 140 may regulate the distance between the suspension part and the object 50 based on information (e.g., pressure data) which is pre-stored for providing an optimum sound quality.

In particular, the processor 140 may control the pressure regulation part 130 to strengthen pressure as the thickness of the object 50 is thick or the material of the object 50 is hard and control the pressure regulation part 130 to weaken the pressure as the thickness of the object 50 is thin or the material of the object 50 is soft.

Pressure data corresponding to information on an object has been described as being stored in a memory in the above-described exemplary embodiment, but this is merely an exemplary embodiment. The pressure data corresponding to the information on the object may be stored in an external server. Here, the audio apparatus 100 may transmit information on a type and the thickness of the object 50, which are sensed, to the external server and receive pressure data corresponding to the type and the thickness of the object 50 from the external server.

Although the user wears any helmet, the user may be provided with optimum audio according to a characteristic of the helmet that the user wears, through the audio apparatus 100 as described above.

Figure 2:
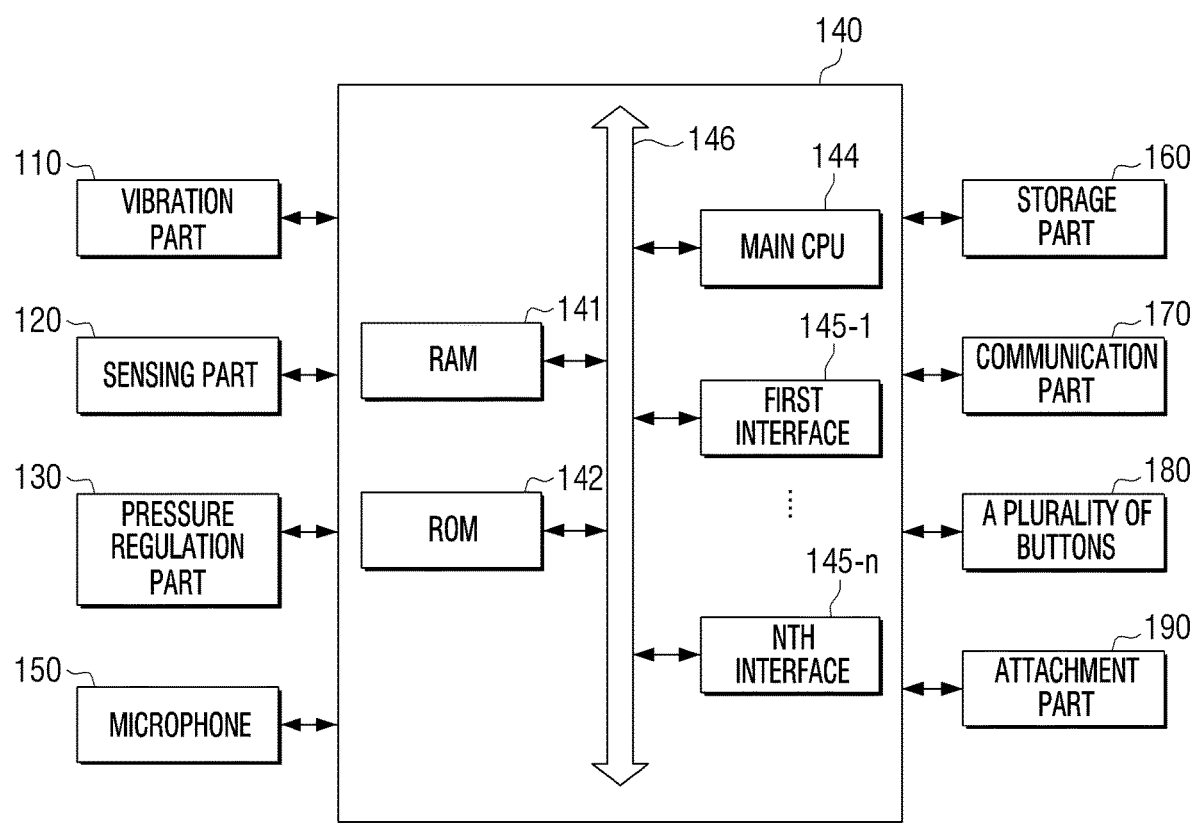
FIG. 2 is a block diagram of a detailed configuration of an audio apparatus according to an exemplary embodiment of the disclosure.

FIG. 2 is a block diagram of a detailed configuration of an audio apparatus according to an exemplary embodiment of the disclosure. As shown in FIG. 2, the audio apparatus 100 includes the vibration part 110, the sensing part 120, the pressure regulation part 130, a microphone 150, a storage part 160, a communicator 170, a plurality of buttons 180, an attachment part 190, and the processor 140. Elements of the audio apparatus 100 shown in FIG. 2 are merely an example and thus are not limited to the block diagram described above. Therefore, some of the elements of the audio apparatus 100 shown in FIG. 2 may be omitted or modified or other types of elements may be added according to a type or a purpose of the audio apparatus 100.

The vibration part 110 provides audio by generating a vibration. Here, the vibration part 110 may provide a vibration corresponding to audio which is received from an external source and provide vibrations corresponding to notification audios of various types of information.

Figure 3A:
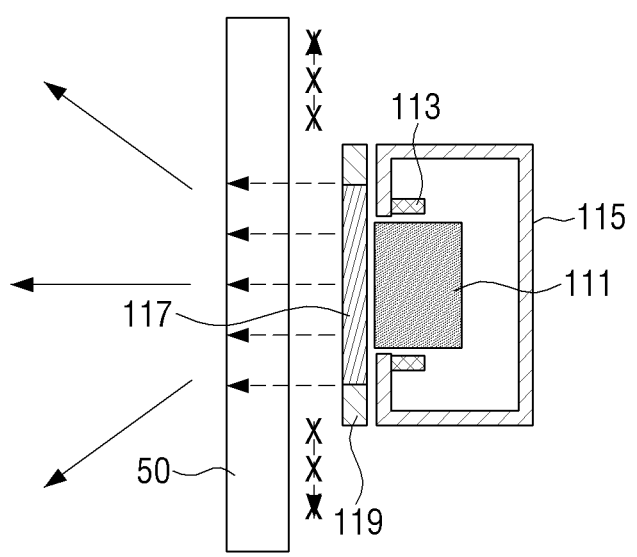
FIGS. 3A and 3B are views illustrating a configuration of a vibration part according to an exemplary embodiment of the disclosure.
Figure 3B:
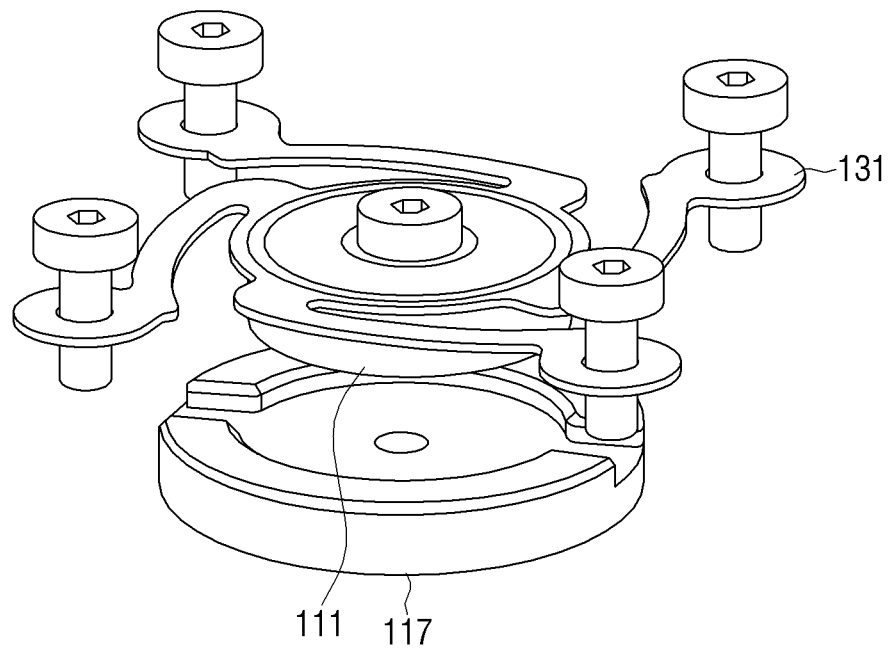

In particular, the vibration part 110 provides a user with audio by vibrating the medium (the helmet 50) through the vibration device. FIGS. 3A and 3B are views illustrating a configuration of a vibration part according to an exemplary embodiment of the disclosure. As shown in FIG. 3A, the vibration part 110 includes a vibration device 111, a coil 113, a first vibration interruption plate 115, a vibration transmission plate 117, and a second vibration interruption plate 119.

The vibration device 111 generates a vibration through an electromagnetic field phenomenon with the coil 113. Here, the vibration device 111 provides audio through a medium by generating a vibration. As shown in FIG. 3B, the vibration device 111 may be housed by a suspension part 131. The vibration device 111 may generate a vibration having a vibration intensity and a vibration pattern corresponding to a current flowing in the coil 113.

The coil 113 generates the vibration of the vibration device 111 through the electromagnetic field phenomenon with a magnet.

The first vibration interruption plate 115 may interrupt a vibration and noise which are generated from an outside and prevent the vibration generated by the vibration device 111 from spreading to the outside. In other words, the first vibration interruption plate 115 may prevent the vibration generated by the vibration device 111 from being transmitted to a second surface opposite to a first surface of the audio apparatus (100?) facing the helmet 50.

Here, the first vibration interruption plate 115 may be formed of stainless steel but is not limited thereto.

The vibration transmission plate 117 is positioned in an area part contacting an external medium by being disposed on the first surface of the audio apparatus 100 facing the helmet 50 and transmits the vibration generated by the vibration device 110 to the external medium (e.g., the helmet 50). Here, as shown in FIG. 3B, the vibration transmission plate 117 may transmit the vibration generated by the vibration device 111 to the object 50 by contacting the vibration device 111.

The second vibration interruption plate 119 may be positioned on a side of the vibration transmission plate 117 and thus may interrupt the vibration of the vibration transmission plate 117 from being transmitted to the outside and enable the vibration of the vibration transmission plate 117 to head for the object 50 when the vibration transmission plate 117 transmits the vibration to the object 50.

In other words, through a structure as shown in FIG. 3A, the user may remove noise, which may occur in a process of transmitting the vibrations through the first vibration interruption plate 113 and the second vibration interruption plate 119 and may hear audio alone.

Referring to FIG. 2 again, the sensing part 120 acquires sensing values through various types of sensors. In particular, the sensing part 120 may acquire a sensing value for sensing at least one of the material and the thickness of the object 50 to which the audio apparatus 100 is attached. In detail, the sensing part 120 may be realized as an ultrasonic sensor and may acquire a sensing value for sensing at least one of the material and the thickness of the object 50 to which the audio apparatus 100 is attached, by using an ultrasonic flaw detection method. Here, the ultrasonic flaw detection method is a method of measuring a shape of an object by transmitting ultrasonic waves to a specimen, detecting discontinuity existing in the specimen, comparing an amount of energy reflected from the discontinuity of the specimen, time for which transmitted ultrasonic waves pass through the specimen, and are reflected from the discontinuity and come back, and a difference in an amount of ultrasonic waves reduced when passing through the specimen with standard data. In other words, the processor 140 may check a cross section of the object 50 based the sensing values which are acquired by the ultrasonic sensor.

Figure 4A:
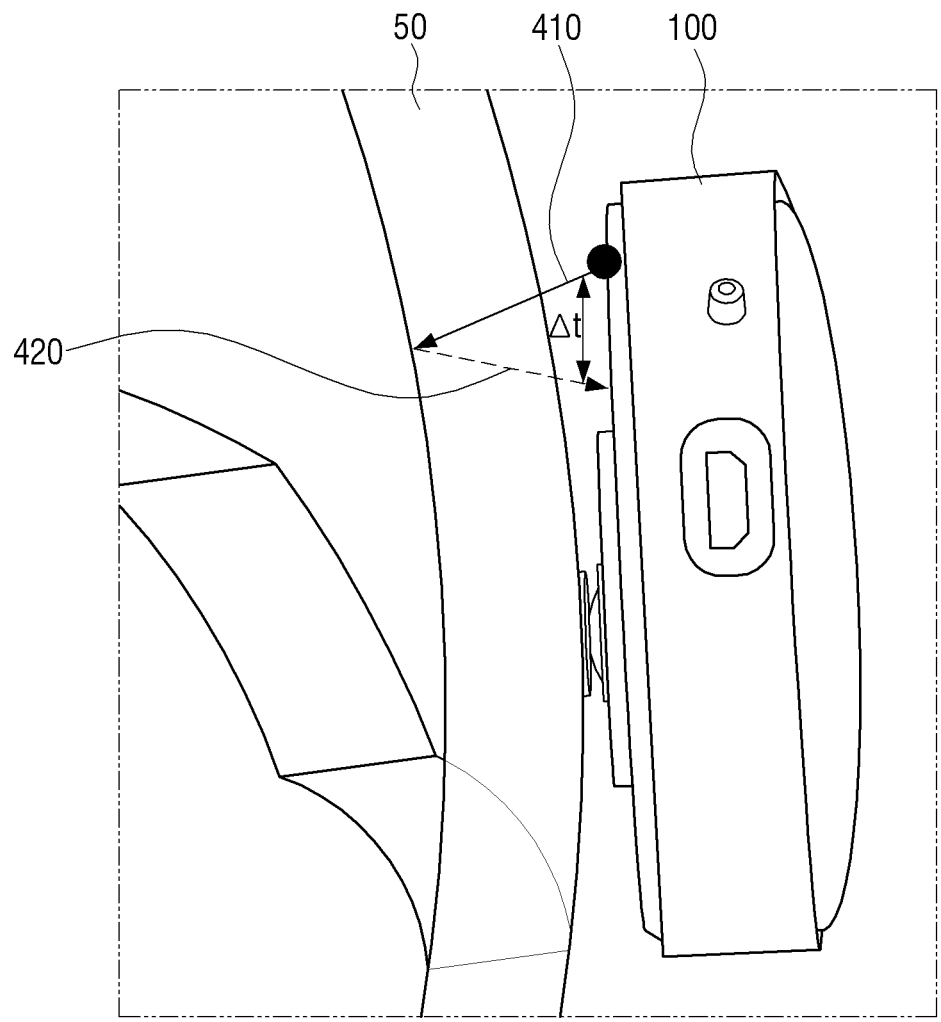
FIGS. 4A through 4F are views illustrating a method of providing an optimum audio signal by using an audio apparatus including a vibration part, according to an exemplary embodiment of the disclosure.

In detail, as shown in FIG. 4A, if an ultrasonic wave 410 generated by the ultrasonic sensor contacts the object 50 and then is reflected 420 from the object 50, the sensing part 120 may measure a thickness of the object 50 by measuring a time Δt for which the ultrasonic wave 410 is generated by the ultrasonic sensor, and contacts and is reflected from a medium. Here, the thickness of the object 50 may be determined by Equation 1 below:

$$D = \frac{1}{2} * \Delta r * \alpha \quad (1)$$

wherein D denotes the thickness of the object 50, Δt denotes the time for which the ultrasonic wave is reflected and comes back, and α denotes a propagation speed coefficient of each material of the object 50. For example, a propagation speed coefficient of the object 50 formed of industrial plastic is between about 1.4 mm/us and about 2.4 mm/us, and a propagation speed coefficient of the object 50 formed of a mixture of polystyrene and sports plastic is about 2.388 mm/us. A propagation speed coefficient of each type (i.e., each material) of the object 50 may be pre-measured and stored in the storage part 160.

Also, when ultrasonic waves generated by the ultrasonic sensor penetrate the object 50, the processor 140 may check a layer of the object 50 by measuring a volume of an absorbed ultrasonic wave and a volume of a scattered ultrasonic wave and then check a type of the helmet 50 by comparing the volumes with pre-stored standard data.

Figure 4B:
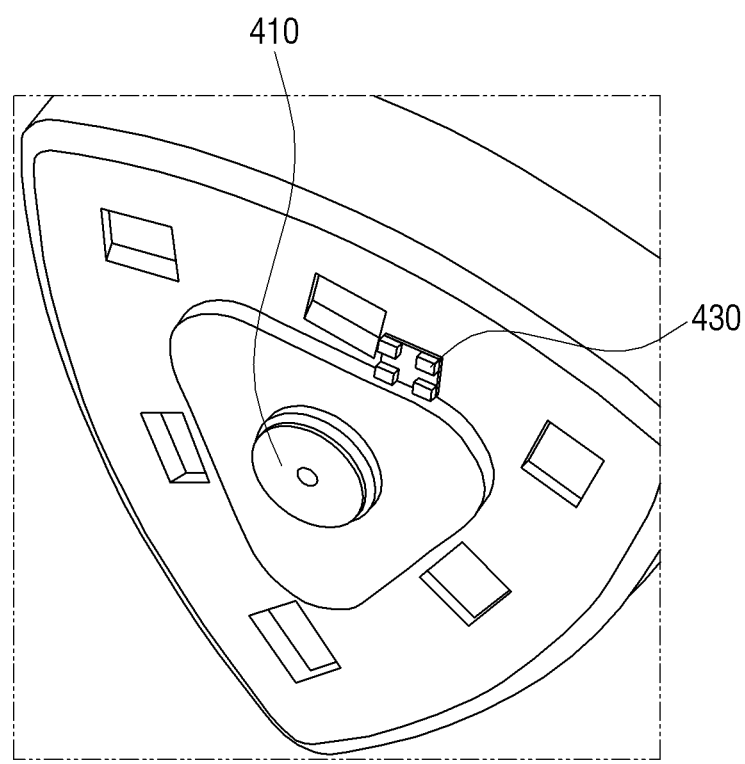
Figure 4C:
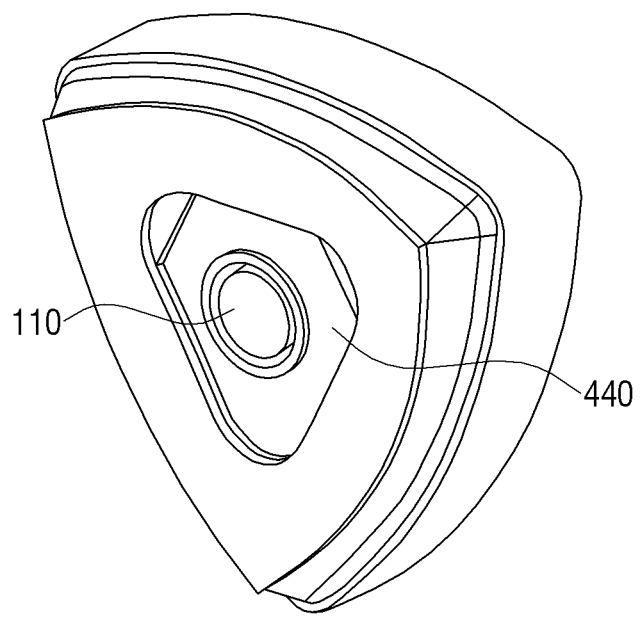
Figure 4D:
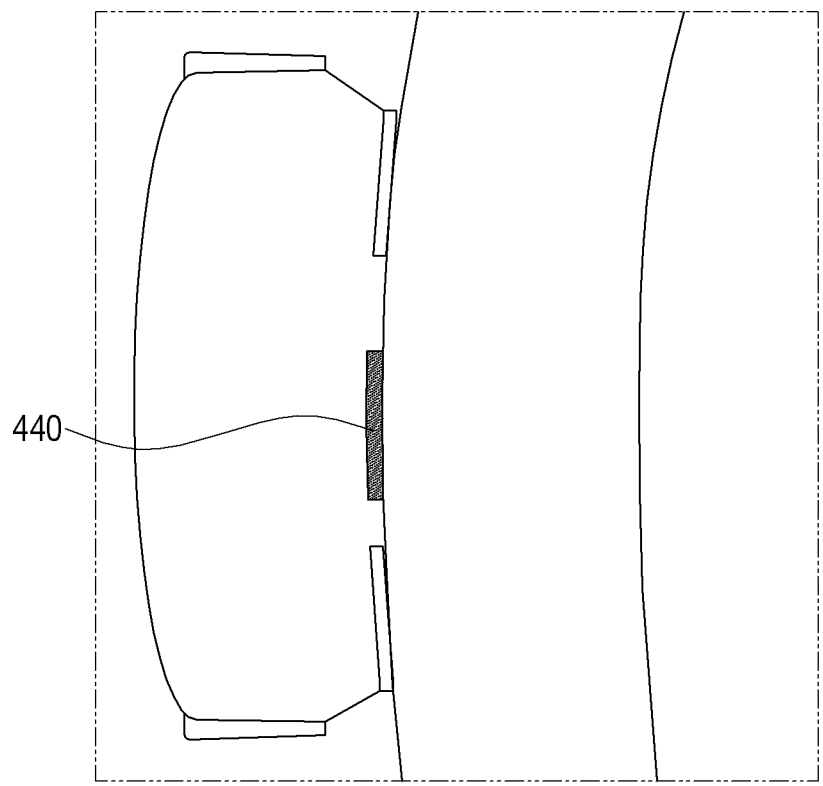
Figure 4E:
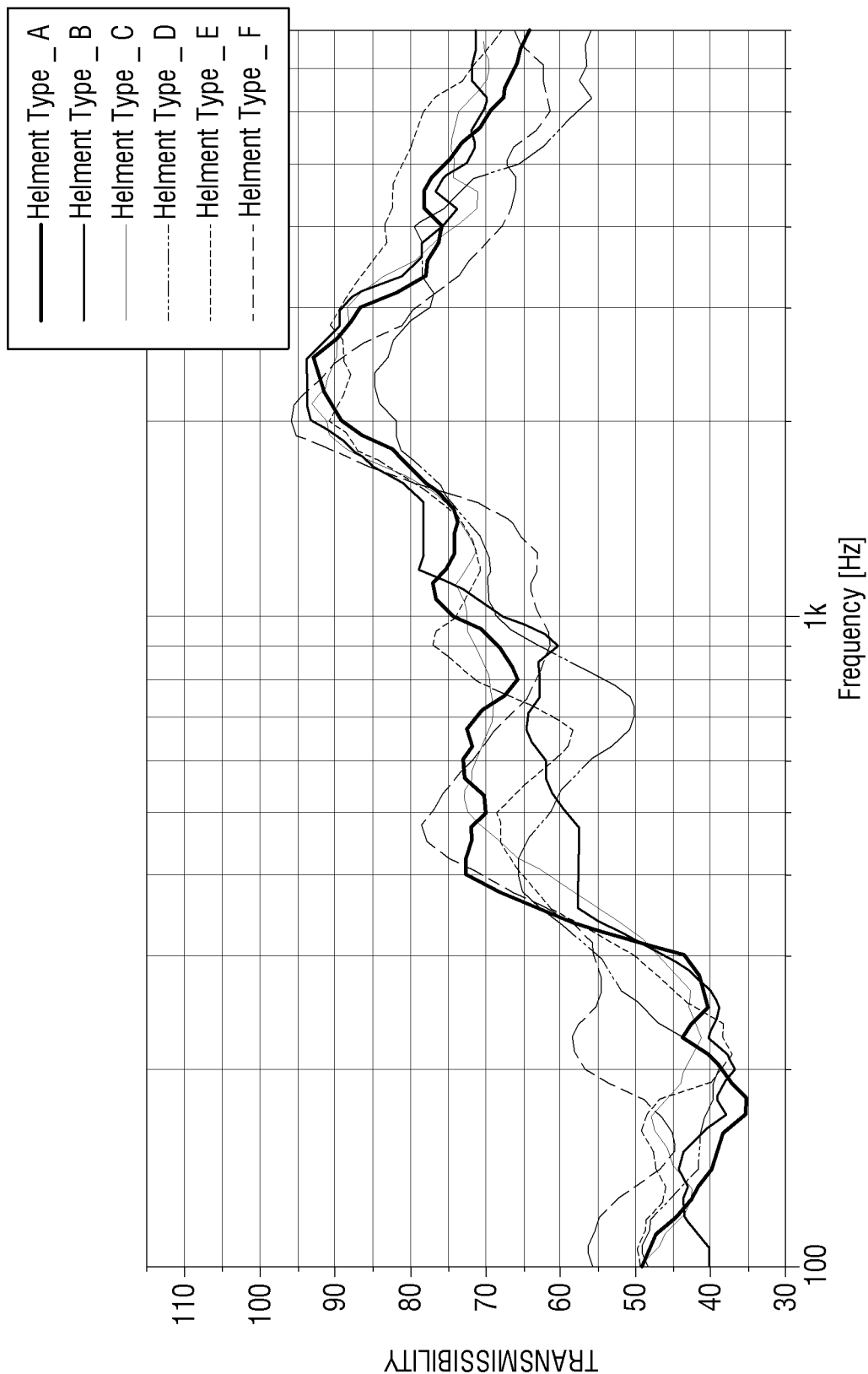

In detail, as shown in FIG. 4E, the storage part 160 may store transmissibility corresponding to each type of the object 50 (e.g., a ratio between a volume of an absorbed ultrasonic wave and a volume of a scattered ultrasonic wave). Here, the storage part 160 may pre-stored values, which are measured in a laboratory, as the transmissibility.

Also, the sensing part 120 may measure a volume of an ultrasonic wave absorbed by the object 50 and a volume of an ultrasonic wave scattered by the object 50, and the processor 140 may determine a type of the object 50 by comparing a ratio between the volume of the absorbed ultrasonic wave and the volume of the scattered ultrasonic wave with pre-stored transmissibility.

According to an exemplary embodiment of the disclosure, the ultrasonic sensor may be realized by using one selected from a vertical probe, a square probe, and an aerial ultrasonic sensor. As shown in FIG. 4B, an ultrasonic sensor 430 according to an exemplary embodiment of the disclosure may be positioned on a side of the vibration part 110. In other words, since the ultrasonic sensor 430 is positioned closest to the vibration part 110, the processor 140 may determine a type and a thickness of an object in an area of the helmet 50 corresponding to the vibration part 110. Also, the sensing part 120 may include various types of sensors besides the ultrasonic sensor. In detail, the sensing part 120 may include a noise sensor for sensing external noise and may include a motion sensor for sensing a motion of the audio apparatus 100, a motion sensor for sensing a motion of a user, and the like. Besides these, the sensing part 120 may include various types of sensors for sensing a surround environment of the audio apparatus 100.

According to an exemplary embodiment of the disclosure, as shown in FIG. 4C, a shielding part 440 may be disposed around the vibration part 110. In other words, as shown in FIG. 4D, the shielding part 440 may prevent audio from being transmitted to the outside by compressing the vibration part 110 and the medium (i.e., the helmet 50). Here, the shielding part 440 may be formed of a rubber or silicon material. The pressure regulation part 130 is an element for regulating pressure which is applied to the object 50 by the vibration part 110. Audio having different sound qualities is provided according to the pressure which is applied to the object 50 by the vibration part 110 or an area of the vibration part 110 which contacts the object 50.

Therefore, for providing an optimum sound quality, the pressure regulation part 130 may mechanically regulate the pressure, which is applied to the object 50 by the vibration part 110, under control of the processor 140.

Figure 5A:
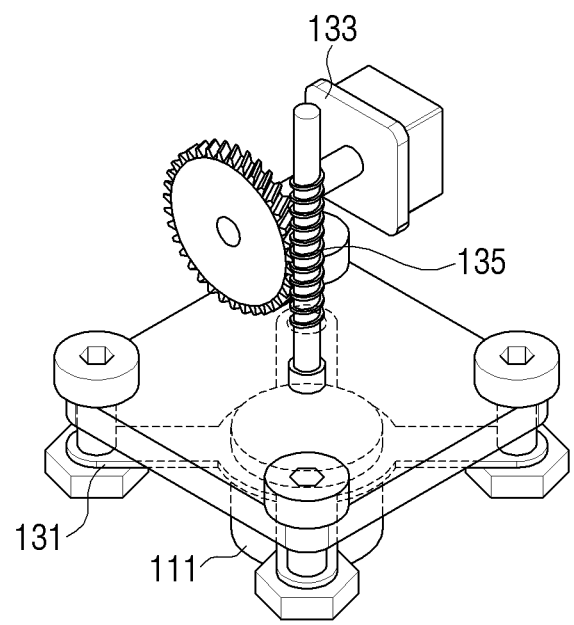
FIGS. 5A and 5B are views illustrating a pressure regulation part according to an exemplary embodiment of the disclosure.

In detail, as shown in FIG. 5A, the pressure regulation part 130 includes a suspension part 131, a motor part 133, and a worm gear 135. Here, the suspension part 131 may support the vibration part 110 and relieve a shock which is applied to the vibration part 110. Also, a distance of the suspension part 131 from the object 50 may be regulated by the motor part 133 and the worm gear 135. The motor part 133 may regulate the distance between the object 50 and the suspension part 131 by manipulating the worm gear 135 under control of the processor 140. In other words, if the worm gear 135 is manipulated in a first direction (e.g., in a downward direction), the motor part 133 may regulate the distance between the object 50 and the suspension part 131 to be distant from each other. Also, if the worm gear 135 is manipulated in a second direction (e.g., in a downward direction), the motor part 133 may regulate the distance between the object 50 and the suspension part 131 to be short from each other. In other words, the pressure regulation part 130 may regulate the pressure, which is applied to the object 50 by the vibration part 110, by regulating the distance between the object 50 and the suspension part 131.

Figure 5B:
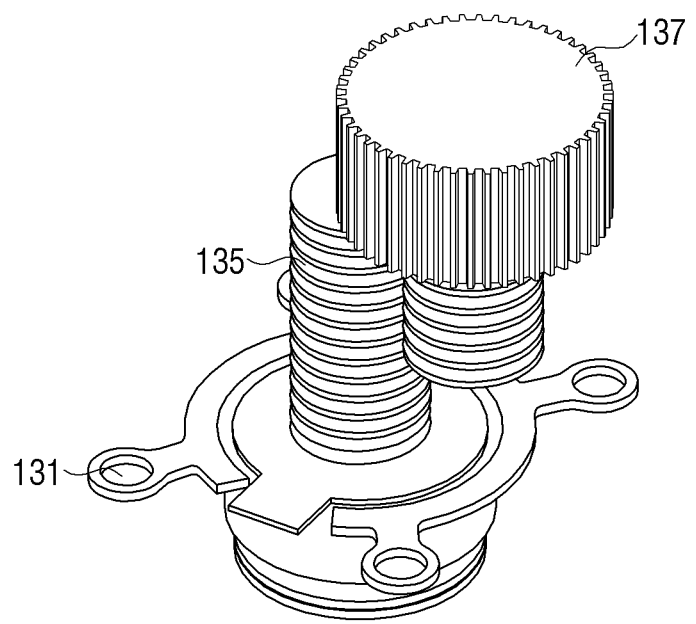

The pressure regulation part 130 has been described as automatically regulating the distance between the suspension part 131 and the object 50 by the processor 140 in the above-described exemplary embodiment, but this is merely an exemplary embodiment. The user may acquire an optimum sound by manually regulating the distance between the suspension part 131 and the object 30 while emitting a standard sound wave into the helmet 50. Here, as shown in FIG. 5B, the pressure regulation part 130 may regulate the distance between the object 50 and the suspension part 131 by including a jog shuttle 137. However, this is merely an exemplary embodiment, the distance between the object 50 and the suspension part 131 may be manually regulated according to various manual methods such as a button and the like.

Also, the pressure regulation part 130 may include both of the motor part 122 and the jog shuttle 137. Here, if the user sets an automatic mode, the pressure regulation part 130 may regulate the pressure, which is applied to the object 50 by the vibration part 110, by using the motor part 133. Also, if the user sets a manual mode (or the user fails to check a type or a thickness of an object which is pre-stored by using a sensing value acquired by the sensing part 120), the pressure regulation part 130 may regulate the pressure, which is applied to the object 50 by the vibration part 110, by using the jog shuttle 137.

The pressure regulation part 130 may regulate the pressure which is applied to the object 50 by the vibration part 110, but this is merely an exemplary embodiment. The pressure regulation part 130 may regulate an area of the vibration part 110 which contacts the object 50. In other words, the pressure regulation part 130 may regulate the area of the vibration part 110, which contacts the object 50, by regulating the distance between the object 50 and the suspension part 131.

The microphone 150 receives a voice of the user. In particular, the voice of the user which is received through the microphone 150 may be transmitted to an external terminal through the communicator 170.

The microphone 150 may be included in the audio apparatus 100, but this is merely an exemplary embodiment. The microphone 150 may be realized as a microphone which is connected to the audio apparatus 100 by wired or wireless.

Also, the microphone 150 may block noise such as a wind sound by including a windscreen which uses a thin net such as sponge or stocking.

The storage part 160 stores various types of modules for driving the audio apparatus 100. For example, the storage part 160 may store software or the like including a base module, a sensing module, a communication module, and a service module. Here, the base module is a base module which processes signals respectively transmitted from pieces of hardware included in the audio apparatus 100 and transmits the processed signals to an upper layer module. The sensing module is a module which collects information from various types of sensors, and analyzes and manages the collected information. The service module is a module which performs various types of services based on the collected sensing information.

As described above, the storage part 160 may include various types of program modules, but some of the various types of program modules may be omitted or modified or some other types of program modules may be added according to a type and a characteristic of the audio apparatus 100. For example, if a display is included in the audio apparatus 100, the storage part 160 may include various types of modules such as a UI module, a presentation module, and the like.

The storage part 160 also stores standard data for determining a type of the object 50. In other words, the storage part 160 may determine the type of the object 50 by mapping information on transmissibility of an ultrasonic wave on information on the type of the object 50 and storing the mapped information.

Also, the storage part 160 stores pressure data for providing optimum audio according to the thickness and the type of the object 50. For example, the storage part 160 may store a table where the type and the thickness of the object are mapped on the pressure data, as shown in Table 1 below.

TABLE 1

| Type and Thickness of Object | Pressure Data |
| --- | --- |
| Ski Helmet (25 mm)(PC + EPP + Fabric) | 230 g |
| Industrial Helmet (12 mm)(ABS + EPP) | 124 g |
| Ski Helmet (27 mm)(ABS Sheet + Foam PU) | 282 g |
| Bike Helmet (30 mm)(Glass Fiber Reinforced Plastic + Compression Reinforced Styrofoam) | 260 g |
| Bike Helmet (48 mm)(ABS + EPP + Sponge + Fabric) | 330 g |
| Bicycle Helmet (20 mm)(PC + EPS) | 189 g |

According to another exemplary embodiment of the disclosure, the storage part 160 may map and store other types of data (e.g., data on the distance between the object 50 and the suspension part 131, data on a movement distance of the worm gear 135, and the like) besides pressure data for controlling the thickness and the type of the object 50 and the motor part 133. Here, the pressure data for controlling the thickness and the type of the object 50 and the motor part 133 or other types of data may be sample data which is measured in a laboratory for providing an optimum sound quality.

The storage part 160 may be realized as a nonvolatile memory or a volatile memory.

The communicator 170 is an element which performs communications with various types of external devices according to various types of communication methods. The communicator 170 may include various types of communication chips such as a WiFi chip, a Bluetooth chip, an NFC chip, a wireless communication chip, and the like. Here, the WiFi chip, the Bluetooth chip, and the NFC chip respectively perform communications according to a WiFi method, a Bluetooth method and an NFC method. Among these, the NFC chip refers to a chip which operates according to a Near Field Communication (NFC) method using 13.56 MHz among various types of RF-ID frequencies such as 135 kHz, 13.56 MHz, 433 MHz, 860~960 MHz, 2.45 GHz, and the like. If the WiFi chip or the Bluetooth chip is used, various types of connection information such as an SSID, a session key, and the like may be transmitted and received, communications may be connected by using the various types of connection information, and various types of information may be transmitted and received. The wireless chip refers to a chip which performs communication according to various types of communication standards such as IEEE, Zigbee, $3^{rd}$ Generation (3G), $3^{rd}$ Generation Partnership Project (3GPP), Long Term Evolution (LTE), and the like.

In particular, the audio apparatus 100 may perform a direct phone call with an external terminal through a wireless communication module. Also, the audio apparatus 100 may perform the phone call with the external terminal by connecting a portable terminal of a helmet wearer existing nearby to Bluetooth communication. In other words, the audio apparatus 100 may receive audio data from the external terminal through the portable terminal and may transmit a user voice, which is input into the audio apparatus 100, to the portable terminal.

Also, the communicator 170 may receive alarm information (e.g., a message alarm or the like) from the portable terminal of the wearer, and the processor 140 may control the vibration part 110 to output an audio alarm based on the received alarm information.

Figure 10A:
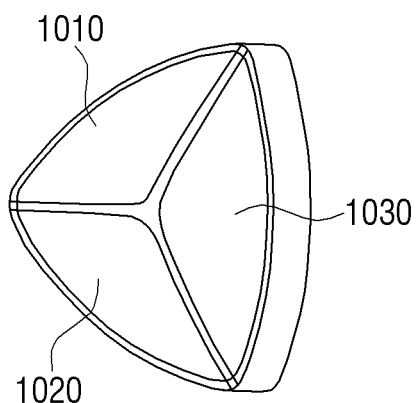
FIGS. 10A through 10E are views illustrating an audio apparatus including a plurality of buttons and an attachment part of the audio apparatus, according to an exemplary embodiment of the disclosure.
Figure 10B:
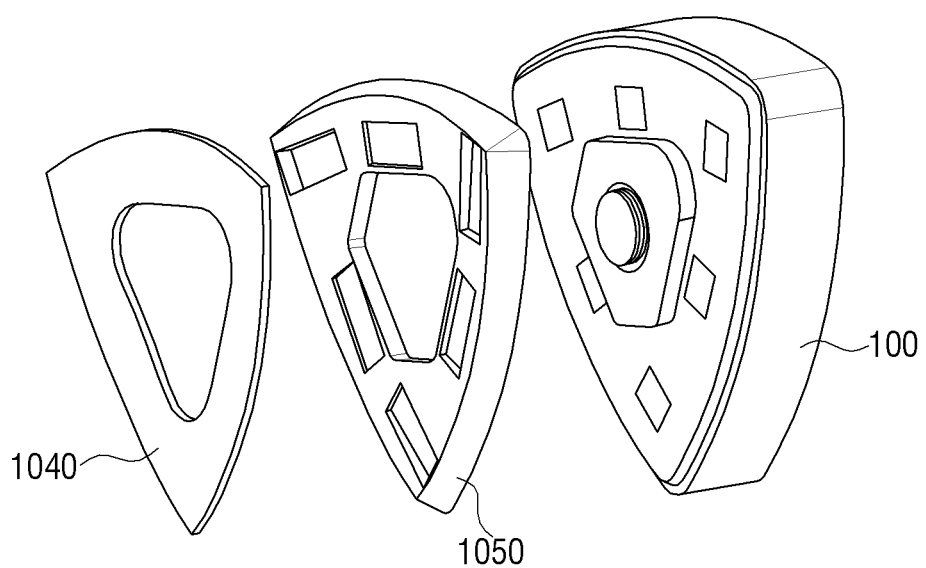

A plurality of buttons 180 may be physically realized on the audio apparatus 100. Here, the plurality of buttons 180 may respectively correspond to a plurality of functions and a plurality of contact numbers. For example, as shown in FIG. 10A, the audio apparatus 100 may include a first button 1010, a second button 1020, and a third button 1030.

Here, the first button 1010 may correspond to a first function (e.g., a communication connection function) and correspond to a first contact number. Also, the second button 1020 may correspond to a second function (e.g., a remaining battery checking function) and correspond to a second contact number. In addition, the third button 1030 may correspond to a third function (e.g., a current time and weather information alarm function) and correspond to a third contact number.

Here, if the user presses one of the plurality of buttons 1010, 1020, and 1030, the processor 140 may perform a function corresponding to the pressed button or may request a phone call to a contact number corresponding to the pressed button by comparing a time at which the user presses the button with a preset time. For example, if an input pressing the first button 1010 shorter than the preset time by the user is sensed, the processor 140 may perform a communication connection function. If an input pressing the first button 1010 longer than or equal to the preset time by the user is sensed, the processor 140 may request a phone call from an external portable terminal corresponding to the first contact number. As another example, if an input pressing the first button 1010 shorter than the preset time by the user is sensed, the processor 140 may request a phone call from an external portable terminal corresponding to the first contact number. If an input pressing the first button 1010 longer than or equal to the preset time by the user is sensed, the processor 140 may perform a communication connection function.

Also, the audio apparatus 100 may provide the user with a notification. The user notification may be an active notification or a passive notification. If the user notification is the active notification, the notification is activated immediately when the user presses a particular button of the plurality of buttons 180, and thus information (e.g., weather, time, a remaining amount of a battery, or the like) that the user wants is notified in Text to Speech (TTS). If the user notification is the passive notification, for example, if the user selects a service that the user selects a service that the user wants to be notified such as a message, an e-mail, a schedule, or the like, through a portable terminal application or the like used for the audio apparatus 100, service information may be analyzed and then provided as a TTS notification for the audio apparatus 100 when the selected service is activated. For example, if the user select a messenger app as an application used for the audio apparatus 100, a sender of a message and contents of the message may be provided in TTS when the message is received in the messenger app. This alarm function may configured to operate in response to a service where the plurality of buttons 180 are respectively activated, and one of the plurality of buttons 180 may take charge of several service functions.

Besides this, the audio apparatus 100 may further include a button for controlling a volume, a power button, and the like.

Indicators indicating corresponding functions may be formed on the plurality of buttons 1010, 1020, and 1030. For example, a phone-shaped indicator may be formed on a button corresponding to a call function, and a text message-shaped indicator may be formed on a button corresponding to a text message check function.

The attachment part 190 is an element which is capable of attaching the audio apparatus 100 to the object 50 (e.g., the helmet). In particular, the attachment part 190 may generate an electromagnet by using a power source of a speaker and then attach the audio apparatus 100 to the object 50 by using the electromagnet. However, this is merely an exemplary embodiment, and thus the attachment part 190 may attach the audio apparatus 100 to the object 50 by using another method.

According to an exemplary embodiment of the disclosure, as shown in FIG. 1.0B, a first attachment part 1040 may be fixed to the helmet 50, and a second attachment part 1050 may be fixed to a main body of the audio apparatus 100. Also, the audio apparatus 100 may be attached to the helmet 50 by attaching (or connecting) the first attachment part 1040 and the second attachment part 1050 to each other. Here, the first attachment part 1040 may be realized as a double-sided tape, a magnet, or the like.

Figure 10C:
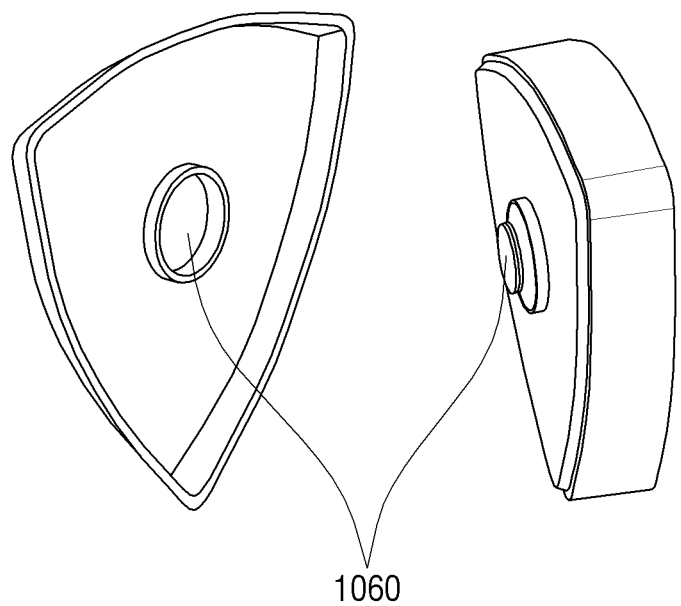
Figure 10D:
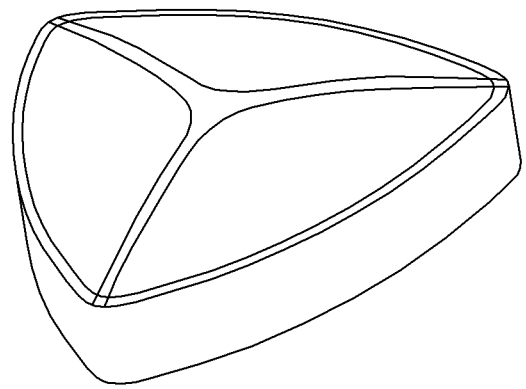
Figure 10D:
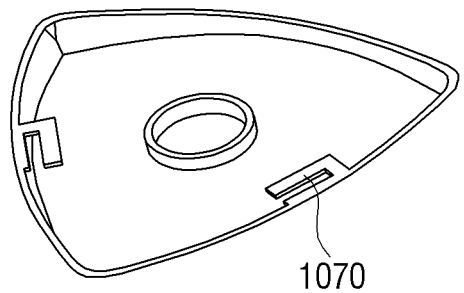
Figure 10E:
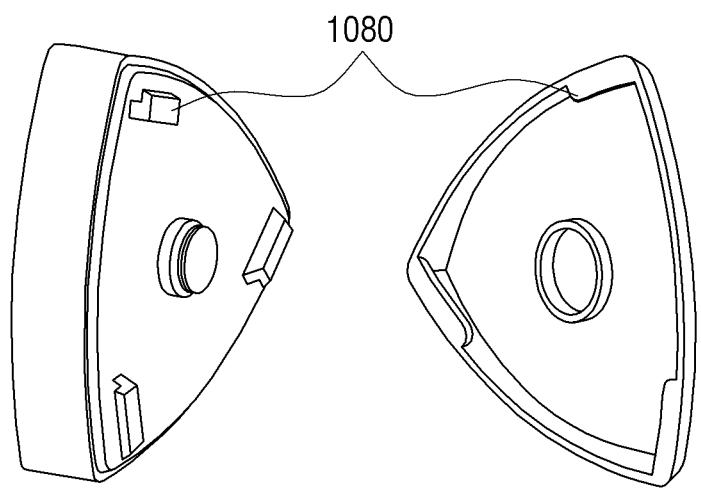

According to another exemplary embodiment of the disclosure, the attachment part 190 may be realized by using a screw thread structure 1060 as shown in FIG. 10C, a hook structure 1070 as shown in FIG. 10D, or a leaf spring structure 1080 as shown in FIG. 10E.

As another example, after the attachment part 190 may be realized as a clip type where an attachment type auxiliary speaker is attached to the object 50, and then a clip of a vibrator speaker is inserted into a groove of the auxiliary speaker, a compression type which is used when attaching a navigation system to a vehicle, i.e., which is compressed and attached to a surface of the object 50 through rubber packing, a band insertion type which includes a vibration speaker inside a goggle band of an ear part if a goggle is used when using the object 50, or the like.

The processor 140 controls an overall operation of the audio apparatus 100 by using various types of programs stored in the storage part 160.

As shown in FIG. 2, the processor 140 includes an RAM 141, a ROM 142, a main CPU 144, first through $n^{th}$ interfaces 145-1 through 145-n, and a bus 146. Here, the RAM 141, the ROM 142, the main CPU 144, the first through $n^{th}$ interfaces 145-1 through 145-n, and the like may be connected to one another through the bus 146.

A command set and the like for system booting are stored in the ROM 142. If power is supplied through an input of a turn-on command, the main CPU 144 boots a system by copying an O/S stored in the storage part 160 into the RAM 141 and executing the O/S according to a command stored in the ROM 142. If booting is completed, the main CPU 144 performs various types of operations by copying various types of application programs stored in the storage part 160 into the RAM 141 and executing the application programs copied into the RAM 141.

The main CPU 144 performs booting by using the O/S stored in the storage part 160 by accessing the storage part 160. Also, the main CPU 144 performs various types of operations by using various types of programs, contents, data, and the like stored in the storage part 160.

The first through $n^{th}$ interfaces 145-1 through 145-n are connected to various types of elements described above. One of interfaces may be a network interface which is connected to an external apparatus through a network.

In addition, although not shown in FIG. 2, the audio apparatus 100 may include a display for displaying various types of information according to a realization example of the audio apparatus 100. Here, the display may be a touch display which is capable of sensing a user touch.

Hereinafter, a control method for the audio apparatus 100 according to various exemplary embodiments of the disclosure will be described with reference to FIGS. 6 through 9.

Figure 6:
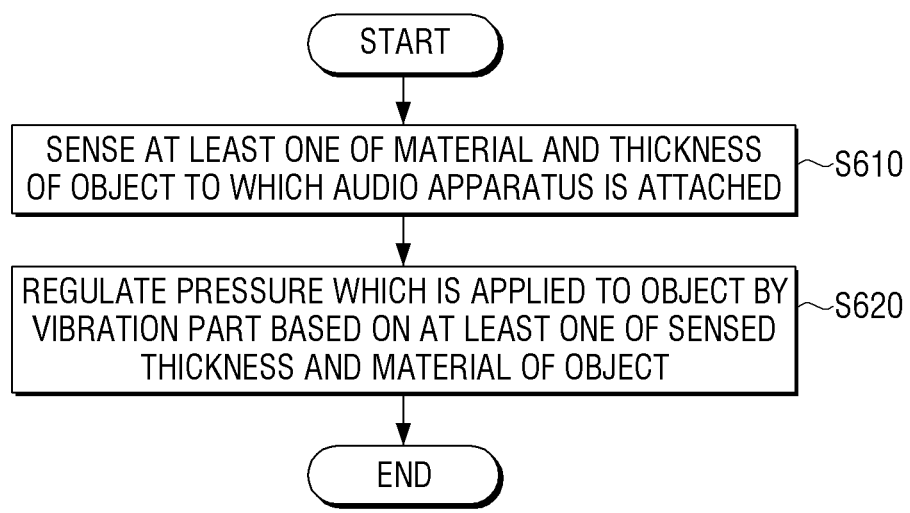
FIGS. 6 through 9 are flowcharts of a method of controlling an audio apparatus, according to various exemplary embodiments of the disclosure.

FIG. 6 is a flowchart of a control method for providing audio having an optimum sound quality by the audio apparatus 100, according to an exemplary embodiment of the disclosure.

In operation S610, the audio apparatus 100 senses at least one of a material and a thickness of the object 50 to which the audio apparatus 100 is attached. Here, as described above, the audio apparatus 100 may sense at least one of the material and the thickness of the object 50, to which the audio apparatus 100 is attached, by using the ultrasonic sensor of the sensing part 120.

In operation S620, the audio apparatus 100 regulates pressure, which is applied to the object 50 by the vibration part 100, based on at least one of the sensed thickness and material of the object 50.

In detail, the processor 140 may search the storage part 160 for pressure data corresponding to information on the sensed thickness and material of the object 50. For example, if a sensed type of the object 50 is a ski helmet of 25 mm (PC+EPP+Fabric), the processor 140 may search for 230 g as pressure data corresponding to the ski helmet of 25 mm. Also, the audio apparatus 100 may control the motor part 133 based on the pressure data.

Here, the processor 140 may control the pressure regulation part 130 to strengthen pressure as the thickness of the object 50 is thick or the material of the object 50 is hard and control the pressure regulation part 130 to weaken the pressure as the thickness of the object 50 is thin or the material of the object 50 is soft. In other words, the processor 140 may control the motor part 133 to make the distance between the suspension part 131 and the object 50 closer to each other as the thickness of the object 50 is thick or the material of the object 50 is hard and may control the pressure regulation part 130 to make the distance between the suspension part 131 and the object 50 longer to each other as the thickness of the object is thin or the material of the object 50 is soft. According to a control method as described above, the audio apparatus 100 may provide optimum audio although the audio apparatus 100 is attached to any type of helmet.

Figure 4F:
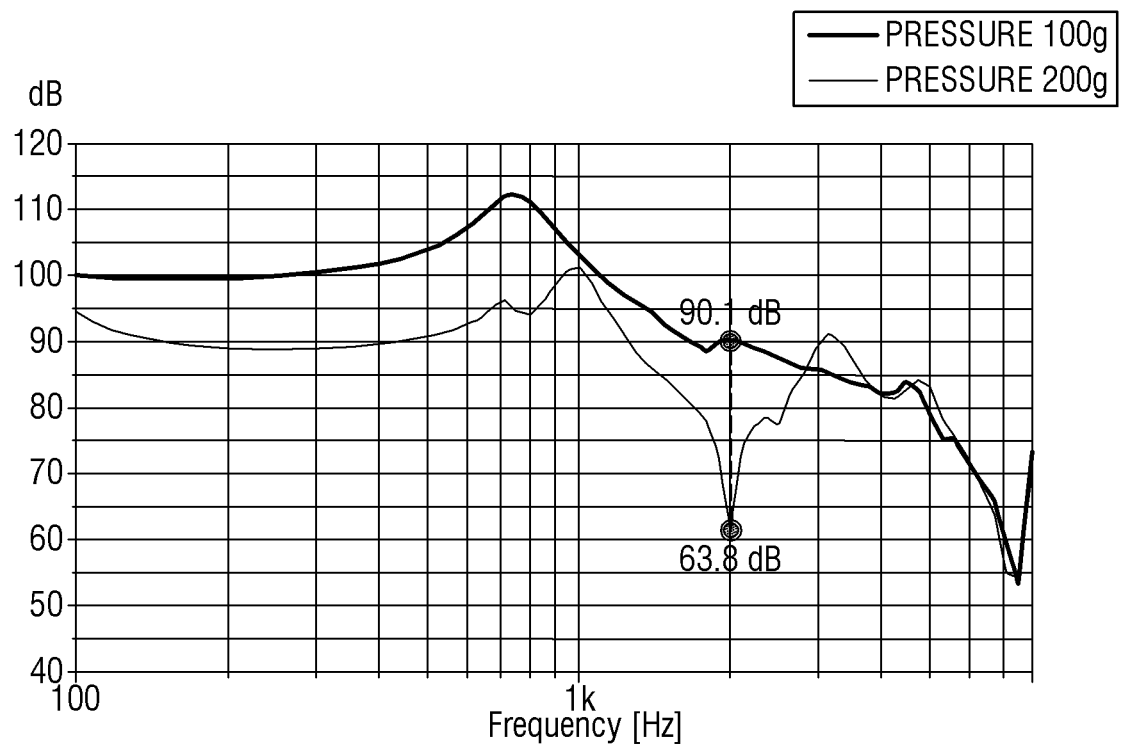
Figure 7:
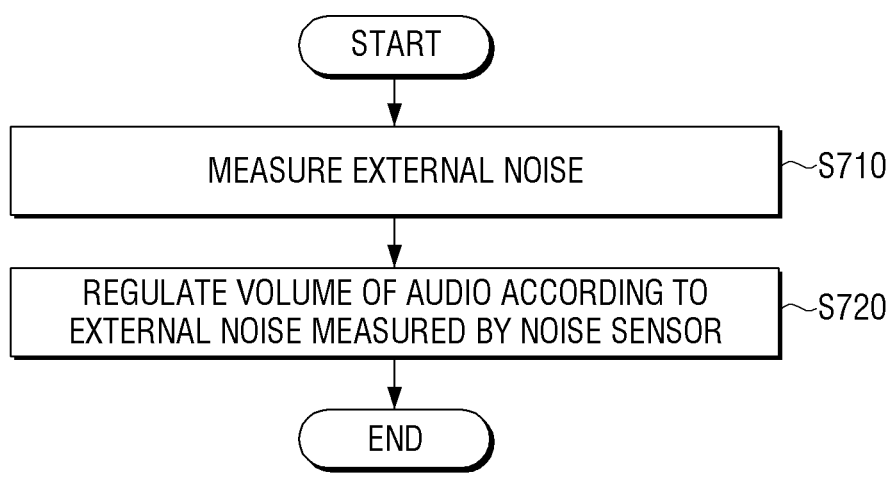

According to another exemplary embodiment of the disclosure, the processor 140 may change pressure, which is applied to the object 50 by the vibration part 110, according to a frequency of provided audio besides a type and a thickness of a medium. In detail, as shown in FIG. 4F, different Sound Pressure Levels (SPLs) may be provided according to pressure which is applied to the object 50 by the vibration part 110 according to each frequency. Therefore, the processor 140 may change pressure, which is applied to the object 50 by the vibration part 110, according to a frequency. For example, if an audio signal of 1500 kHz is provided, the processor 140 may control the pressure regulation part 130 to make the pressure, which is applied to the object 50 by the vibration part 110, be 100 g. FIG. 7 is a flowchart of a method of controlling an audio volume according to external noise, according to an exemplary embodiment of the disclosure.

In operation S710, the audio apparatus 100 may measure external noise by using a noise sensor.

In operation S720, the audio apparatus 100 may regulate a volume of audio according to the external noise measured by the noise sensor. In detail, the processor 140 may regulate the audio volume according to a size of the external noise. For example, the processor 140 may measure a volume dB of noise occurring around and provide audio having an optimum volume by automatically regulating the audio to an appropriate volume lager than the measured volume dB. Here, the processor 140 may measure and store a basic user average phone call volume and provide audio having an optimum volume based on the stored user average phone call volume. In other words, the user may be provided with audio having an optimum volume without an additional user manipulation by providing audio which does not stray from the user average phone call volume and is larger than current noise.

Figure 8:
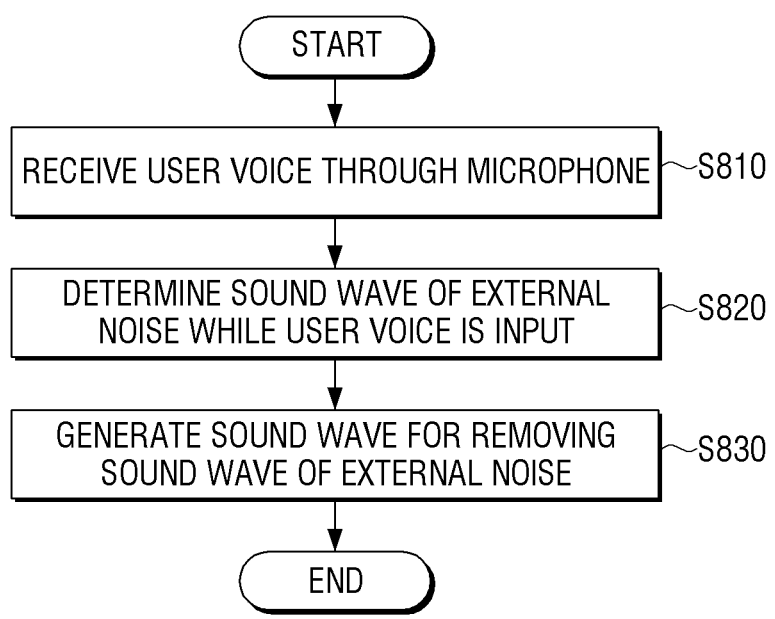

FIG. 8 is a flowchart of a method of providing a user voice by filtering external noise, according to an exemplary embodiment of the disclosure.

In operation S810, the audio apparatus 100 may receive a user voice through the microphone 150 while performing communication with an external terminal.

In operation S820, the audio apparatus 100 may determine a sound wave of external noise while the user voice is input.

In operation S830, the audio apparatus 100 may generate a sound wave for removing the sound wave of the external noise. In detail, the processor 140 may transmit merely the user voice, which is received through the microphone 150, to the external terminal by determining external noise of audio received through the microphone 150, generating a sound wave contrary to the sound wave of the external noise, and synthesize the generated sound wave and the external noise. Therefore, the user may provide the external terminal with a user voice having an optimum sound quality.

According to an exemplary embodiment of the disclosure, the audio apparatus 100 may provide audio (e.g., a horn sound) having a particular frequency band by filtering external noise to make the audio having the particular frequency band heard besides a user voice. In detail, if audio higher than or equal to a preset value is sensed in a time domain, the audio apparatus 100 may perform a frequency analysis (e.g., Short Time Fourier Transform (STFT)) with respect to received audio. Also, the audio apparatus 100 may determine whether audio having a particular frequency band occurs by comparing audio of a current time point with a frequency of audio within a preset section. In addition, the audio apparatus 100 may provide merely audio having a particular frequency band by removing noise except for the audio having the particular frequency band.

Figure 9:
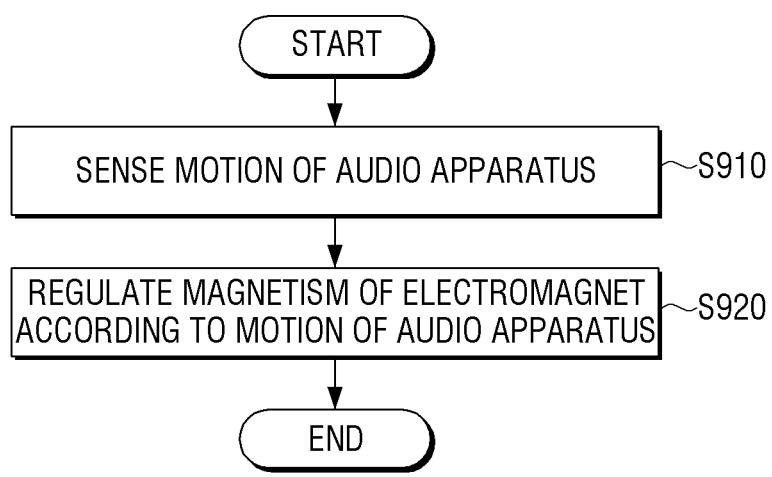

FIG. 9 is a flowchart of a method of controlling an attachment force of the audio apparatus 100 according to a motion of the audio apparatus 100, according to an exemplary embodiment of the disclosure.

In operation S910, the audio apparatus 100 may sense a motion of the audio apparatus 100 through a motion sensor. For example, the sensing part 120 may sense a movement speed, swaying, and the like of the audio apparatus 100 by using the motion sensor.

In operation s920, the audio apparatus 100 may regulate a magnetism of an electromagnet according to the motion of the audio apparatus 100. In detail, the audio apparatus 100 may control the attachment part 190 to attach the audio apparatus 100 to the object 50 with a constant attachment force by strongly controlling the magnetism of the electromagnet included in the attachment part 190 as the motion of the audio apparatus 100 is fast or the audio apparatus 100 sways much.

In detail, the audio apparatus 100 may sense speed information of a user who wears the helmet 50 and regulate an attachment force for fixing (or attaching) the audio apparatus 100 to the helmet 50 according to the speed information. For example, if the user moves on a motorcycle with a motorcycle helmet, and a speed faster than or equal to a threshold value is sensed, the audio apparatus 100 may increase the attachment force by increasing the magnetism of the electromagnet of the attachment part 190. Therefore, although a movement speed of the user is fast, the audio apparatus 100 may be fixed to the helmet 50.

Also, the audio apparatus 100 may sense the attachment force, by which the audio apparatus 100 is attached to the helmet 50, by sensing whether the user wears the helmet 50. In detail, if it is sensed that the user does not wear the helmet 50, the user may control the audio apparatus 100 to be easily detached from the helmet 50 by reducing the attachment force of the audio apparatus 100.

In addition, since the audio apparatus 100 regulates the attachment force, by which the audio apparatus 100 is attached to the helmet 50, by sensing a user motion, the attachment and the detachment of the audio apparatus 100 may become easier. For example, if a first user motion (e.g., a user motion knocking a helmet one time or the like) is sensed, the audio apparatus 100 may increase the attachment force. If a second user motion (e.g., a user motion knocking the helmet two times) is sensed, the audio apparatus 100 may reduce the attachment force.

According to another exemplary embodiment of the disclosure, if the audio apparatus 100 is attached to the helmet 50, the audio apparatus 100 may automatically perform wireless charging by receiving power from the helmet 50. In detail, if the helmet 50 includes a solar charger (e.g., a solar cell), the helmet 50 may store power which is received from the solar charger. Also, the audio apparatus 100 may perform wireless charging of a battery by using the stored power. In addition, the audio apparatus 100 may transmit emergency situation information to an external source by sensing an emergency situation of the user (e.g., an accident, an emergency situation, or the like). For example, if a preset button included in the audio apparatus 100 is sensed, a preset user voice is sensed, abnormal bio-information is sensed, or a shock larger than or equal to a preset value is sensed, the audio apparatus 100 may transmit the emergency situation information to the external apparatus (e.g., a pre-registered apparatus, a government office, or the like) by sensing that the user is in the emergency situation.

Figure 11:
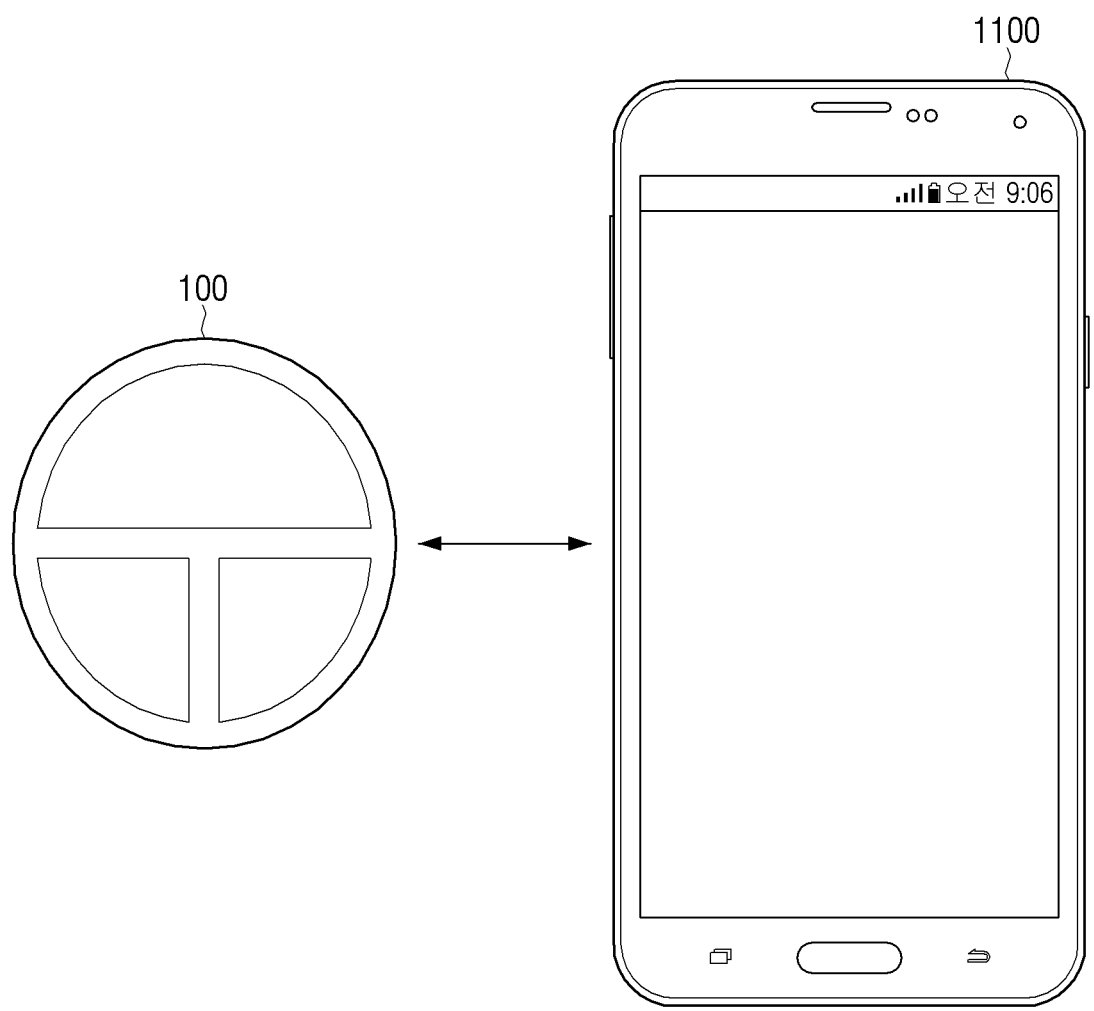
FIG. 11 is a view illustrating a system including an audio apparatus and a portable terminal, according to an exemplary embodiment of the disclosure.

FIG. 11 is a view illustrating a system including the audio apparatus 100 and a portable terminal 1100, according to an exemplary embodiment of the disclosure. Here, the portable terminal 1100 may be a portable terminal which is carried by the user who wears the object 50 to which the audio apparatus 100 is attached.

The audio apparatus 100 may perform a communication connection with the portable terminal 1100. Here, the audio apparatus 100 may perform the communication connection with the portable terminal 110 by using a short-range communication module such as Bluetooth, Zigbee, or the like.

Also, the audio apparatus 100 may receive a phone call request of an external terminal from the portable terminal 1100. Here, a notification of the phone call request may be provided in an audio form through the vibration part 110. In addition, the audio apparatus 100 may receive an other person's voice, which is received from the external terminal while a phone call is performed, from the portable terminal 1100. Also, the audio apparatus 100 may transmit a user voice, which is received through the microphone 150, to the portable terminal 1100. In other words, the audio apparatus 100 may perform a phone call with the external terminal through the portable terminal 1100.

The audio apparatus 100 may receive various types of notification information from the portable terminal 1100. In detail, the audio apparatus 100 may receive various types of notification information, such as message reception information, time notification information, schedule notification information, and the like, from the portable terminal 1100.

The audio apparatus 100 may be provided with information, which is received from the portable terminal 1100, as an audio signal through a US function. For example, if the portable terminal 1100 receives a text message from an external source, the audio apparatus 100 may receive information on a text reception event and provide the information on the text reception event as a voice through a TTS module.

Also, the portable terminal 110 may receive battery information and use time information of the audio apparatus 100, and position information of users, who wear other audio apparatuses, from the audio apparatus 100 and provide the battery information, the use time information, and the position information.

If the portable terminal 1100 which is connectable is sensed, the audio apparatus 100 may provide information on the portable terminal 1100 which is connectable. Here, the audio apparatus 100 may provide the information in an auditory form through the vibration part 110, but this is merely an exemplary embodiment. If the audio apparatus 100 includes a display, the audio apparatus 100 may provide the information in a visual form.

Also, the audio apparatus 100 may perform communication connection and disconnection with the portable terminal 1100 by using one of a plurality of buttons.

Figure 12:
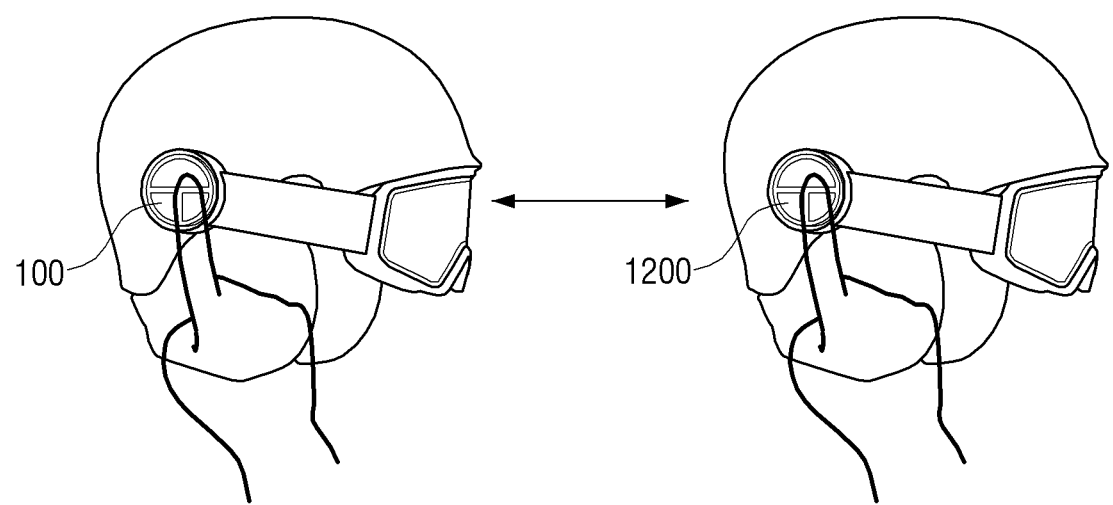
FIG. 12 is a view illustrating a system including a plurality of audio apparatuses according to an exemplary embodiment of the disclosure.

In addition, as shown in FIG. 12, the audio apparatus 100 may perform a communication connection to another external audio apparatus 1200. Here, the audio apparatus 100 and the another external audio apparatus 1200 may perform communication by using a short-range wireless communication module. For example, for voice communications between firefighters when a disaster occurs, audio apparatuses 100 may be attached to helmets of the firefighters, and communications may be performed between the firefighters through the audio apparatuses 100. Besides this, if a plurality of persons wear helmets for a military operation or a mine work, voice communications may be performed by using a plurality of audio apparatuses.

Also, the audio apparatus 100 may provide an equalizer function by regulating an output in real time according to a genre (or a frequency band) of music which is currently played.

If a preset event (e.g., a user motion, a momentary shock, or the like) is sensed from the helmet 50, the audio apparatus 100 may perform a play function and a stop function of music.

A control method for an audio apparatus according to various exemplary embodiments described above may be embodied as a program and then provided for a user terminal apparatus. In detail, a non-transitory computer readable medium which stores a program including a control method for a user terminal apparatus may be provided.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as CDs, DVDs, hard disks, Blu-ray disks, USBs, memory cards, and ROM.

The foregoing exemplary embodiments and advantages are merely exemplary and are not to be construed as limiting the disclosure. The present teaching may be readily applied to other types of apparatuses. Also, the description of the exemplary embodiments of the disclosure is intended to be illustrative, and not to limit the scope of the claims, and many alternatives, modifications, and variations will be apparent to those skilled in the art.

The invention claimed is:

1. An audio apparatus comprising:
a main body comprising a vibration device which generates a vibration, a vibration transmission part which is disposed on a first surface of the audio apparatus facing a helmet and transmits the vibration generated by the vibration device to the helmet, and a first vibration shielding part which is disposed around the vibration device and prevents the vibration generated by the vibration device from being transmitted to a second surface of the audio apparatus opposite to the first surface;
a first attachment part which is attached to the main body of the audio apparatus;
a second attachment part which is attached to the helmet and is connected to the first attachment part;
a sensing part which acquires a thickness of the helmet;
a pressure regulation part for regulating a pressure applied to the helmet by the vibration device; and
a processor configured to control the pressure regulation part to regulate the pressure applied to the helmet by the vibration device based on the acquired thickness of the helmet.

2. The audio apparatus of claim 1, further comprising:
a suspension part which supports the vibration device.

3. The audio apparatus of claim 1, further comprising:
a second vibration shielding part which is disposed on a side of the vibration transmission part and prevents the vibration transmitted from the vibration transmission part from being transmitted to the side of the audio apparatus.

4. The audio apparatus of claim 1, further comprising:
a communicator which performs communication with an external apparatus.

5. The audio apparatus of claim 4, further comprising:
a microphone which receives an input of audio comprising a user voice,
wherein the processor removes external noise from the audio, which is received through the microphone, except for the user voice.

6. The audio apparatus of claim 4, further comprising:
a button,
wherein based on a user input being received through the button, the processor controls the communicator to transmit a control signal corresponding to the user input to the external apparatus.

7. The audio apparatus of claim 4, further comprising:
a plurality of buttons,
wherein the processor performs a first function corresponding to a first button based on a user input being received through the first button of the plurality of buttons and performs a second function corresponding to a second button based on a user input being received through the second button.

8. The audio apparatus of claim 4, wherein based on an event being received from the external apparatus through the communicator, the processor controls the vibration device to generate a vibration corresponding to the event.

9. The audio apparatus of claim 4, further comprising:
a sensor which senses an external shock,
wherein based on a shock larger than or equal to a preset value, being sensed through the sensor, the processor controls the communicator to transmit information corresponding to the sensed shock to the external apparatus.

* * * * *